US011167353B2

(12) United States Patent
Ullmann et al.

(10) Patent No.: US 11,167,353 B2
(45) Date of Patent: Nov. 9, 2021

(54) HOMOGENEOUS SUCTION DURING ADDITIVE MANUFACTURING

(71) Applicant: TRUMPF Laser- und Systemtechnik GmbH, Ditzingen (DE)

(72) Inventors: Björn Ullmann, Ludwigsburn (DE); Jörg Zaiss, Eberdingen (DE)

(73) Assignee: TRUMPF Laser- und Systemtechnik GmbH, Ditzingen (DE)

(*) Notice: Subject to any disclaimer, the term of this patent is extended or adjusted under 35 U.S.C. 154(b) by 33 days.

(21) Appl. No.: 16/408,669

(22) Filed: May 10, 2019

(65) Prior Publication Data

US 2019/0270138 A1 Sep. 5, 2019

Related U.S. Application Data

(63) Continuation of application No. PCT/EP2017/078803, filed on Nov. 9, 2017.

(30) Foreign Application Priority Data

Nov. 10, 2016 (DE) .......................... 102016121490.6

(51) Int. Cl.
*B29C 64/153* (2017.01)
*B22F 12/00* (2021.01)
(Continued)

(52) U.S. Cl.
CPC .............. *B22F 12/00* (2021.01); *B28B 1/001* (2013.01); *B29C 64/153* (2017.08);
(Continued)

(58) Field of Classification Search
CPC ..... B29C 64/153; B29C 64/35; B29C 64/268; B29C 64/371; B33Y 10/00; B33Y 30/00; B33Y 40/00; B22F 2201/11
See application file for complete search history.

(56) References Cited

U.S. PATENT DOCUMENTS 6,583,379 B1  6/2003 Meiners et al.
10,252,333 B2  4/2019 McMurtry et al.
(Continued)

FOREIGN PATENT DOCUMENTS

CN  101321600 A  12/2008
CN  104353832     2/2015
(Continued)

OTHER PUBLICATIONS

DE Office Action in German Appln. No. DE 102016121490.6, dated Aug. 9, 2017, 14 pages (with English translation).
(Continued)

*Primary Examiner* — Yung-Sheng M Tsui
(74) *Attorney, Agent, or Firm* — Fish & Richardson P.C.

(57) ABSTRACT

A production device comprises a main housing, an optical system that provides a beam for the irradiation of powder in a building platform area of a working surface for producing a component layer by layer, and a shielding gas system for providing a two-dimensional stream of shielding gas. The shielding gas system has at least one outlet opening structure and a suction-removal opening structure on opposite sides of the main housing, and the two-dimensional stream of shielding gas flows over the working surface between the opposite sides. The shielding gas system also has at least one secondary outlet opening for the flowing in of gas in the direction of the two-dimensional stream of shielding gas, which is designed for the forming of at least one secondary stream of shielding gas, which plays a part in determining the flow profile of the two-dimensional stream of shielding gas.

17 Claims, 4 Drawing Sheets

(51) Int. Cl.
*B29C 64/35* (2017.01)
*B29C 64/268* (2017.01)
*B29C 64/371* (2017.01)
*B28B 1/00* (2006.01)
*C04B 35/64* (2006.01)
*B33Y 10/00* (2015.01)
*B33Y 30/00* (2015.01)
*B33Y 40/00* (2020.01)
*B22F 10/10* (2021.01)

(52) U.S. Cl.
CPC ............ *B29C 64/268* (2017.08); *B29C 64/35* (2017.08); *B29C 64/371* (2017.08); *C04B 35/64* (2013.01); *B22F 10/10* (2021.01); *B22F 2201/11* (2013.01); *B22F 2999/00* (2013.01); *B33Y 10/00* (2014.12); *B33Y 30/00* (2014.12); *B33Y 40/00* (2014.12); *Y02P 10/25* (2015.11)

(56) References Cited

U.S. PATENT DOCUMENTS

| | | | |
|---|---|---|---|
| 10,442,001 B2 * | 10/2019 | Jakimov | ............... B22F 3/1007 |
| 10,493,562 B2 | 12/2019 | Dimter et al. | |
| 2004/0012112 A1 | 1/2004 | Davidson et al. | |
| 2009/0266803 A1 | 10/2009 | Perret et al. | |
| 2016/0114531 A1 | 4/2016 | Chuang et al. | |

FOREIGN PATENT DOCUMENTS

| | | | | |
|---|---|---|---|---|
| CN | 105102160 A | | 11/2015 | |
| CN | 105451970 A | | 3/2016 | |
| DE | 19853947 | | 2/2000 | |
| DE | 102006014835 | | 10/2007 | |
| DE | 102010052206 | | 5/2012 | |
| DE | 102014205875 A1 | * | 10/2015 | ......... B23K 26/1476 |
| DE | 102016121770 A1 | * | 5/2018 | ........... B29C 64/371 |
| EP | 1839781 | | 10/2007 | |
| EP | 2732890 | | 5/2014 | |
| EP | 2774703 A1 | | 9/2014 | |
| EP | 2862651 | | 4/2015 | |
| EP | 3023228 | | 5/2016 | |
| EP | 3147047 | | 3/2017 | |
| WO | WO 2010/007394 | | 1/2010 | |
| WO | WO-2010007394 A1 | * | 1/2010 | .............. B22F 10/20 |
| WO | WO 2015/189619 | | 12/2015 | |
| WO | WO-2015189619 A1 | * | 12/2015 | ........... B29C 64/268 |
| WO | WO2016083298 A1 | | 6/2016 | |

OTHER PUBLICATIONS

PCT International Preliminary Report on Patentability in International Appln. No. PCT/EP2017/078803, dated May 23, 2019, 23 pages (with English translation).
PCT International Search Report and Written Opinion in International Appln. No. PCT/EP2017/078803, dated Feb. 3, 2018, 26 pages (with English translation).
CN Office Action in Chinese Appln. No. 201780069638.2, dated Mar. 2, 2021, 21 pages (with English translation).

* cited by examiner

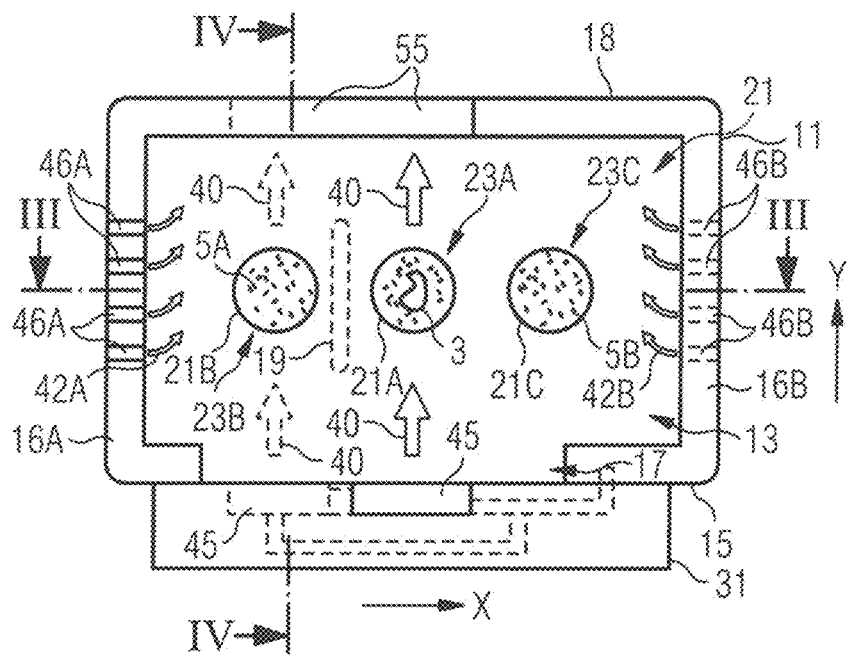
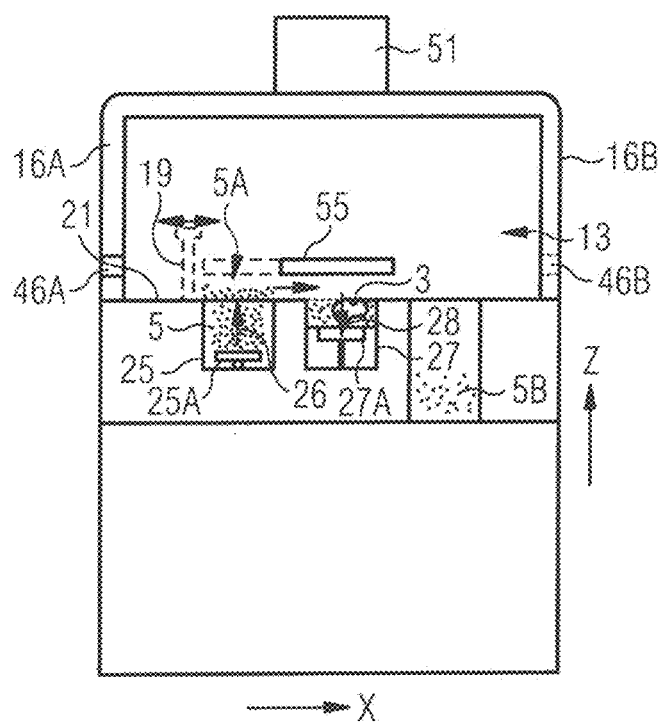
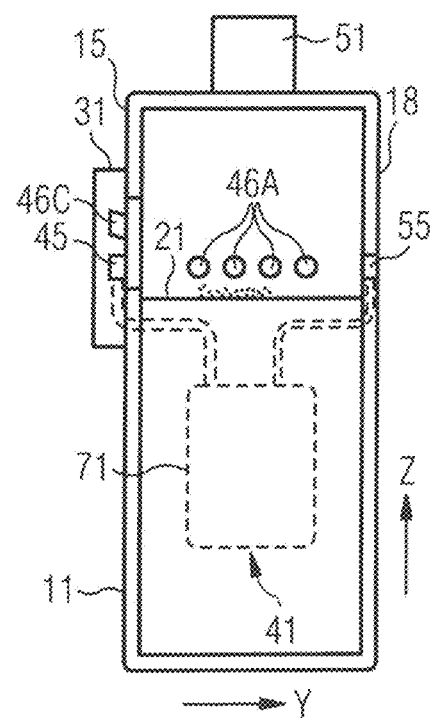

HOMOGENEOUS SUCTION DURING ADDITIVE MANUFACTURING

CROSS REFERENCE TO RELATED APPLICATIONS

This application is a continuation of and claims priority under 35 U.S.C. § 120 from PCT Application No. PCT/EP2017/078803, filed on Nov. 9, 2017, which claims priority from German Application No. 10 2016 121 490.6, filed on Nov. 10, 2016. The entire contents of each of these priority applications are incorporated herein by reference.

TECHNICAL FIELD

The present disclosure relates to devices and methods for laser-based additive manufacturing and suction of shielding gas during additive manufacturing.

BACKGROUND

Laser-based additive manufacturing of metallic or ceramic workpieces is based on a solidification of a starting material present in powder form by irradiation with laser light. This concept—also known as selective laser melting, powder bed fusion, or laser metal fusion (LMF)—is used in machines for (metal) 3D printing. An exemplary LMF machine for the additive manufacturing of three-dimensional products is disclosed in the European patent application EP 2 732 890 A1. The advantages of additive manufacturing are generally a simple manufacture of complex and individually creatable parts. Thereby, defined structures in the interior and/or force flow-optimized structures can be realized.

For the reproducible interaction of the laser light with the powder, a homogeneous state of the conditions in the manufacturing area is important because varying conditions can result in differently solidified material structures.

EP 3 023 228 A1 discloses a machine for additive manufacturing of three-dimensional products on a platform that provides a gas flow over the platform for the removal of, for example, smoke from the interaction zone. Other gas circuit configurations are described in DE 198 53 947 C1, DE 10 2010 052 206 A1, DE 10 2006 014 835 A1, WO 2010/007394 A1, EP 1 839 781 A2 and EP 3 147 047 A1. For example, in DE 198 53 947 C1 and EP 3 147 047 A1 laterally inflowing shielding gas is combined in the processing zone with a shielding gas stream directed from top to bottom to prevent any deflection of the laterally inflowing protective gas upwards and thus inter alia protect a beam coupling-in window from contamination.

SUMMARY

This disclosure describes methods of improving the suction-removal characteristics in the manufacturing chamber and in the region of a building platform. Furthermore, this disclosure is based on increasing the suction-removal capacity during an LMF process, without increasing the flow velocity in the region of the building platform.

In one aspect, the disclosure features manufacturing devices for the additive manufacturing of a three-dimensional component from a powder that include a main housing, which provides a working surface in a manufacturing chamber on which a building platform region is provided; an optical system, which can be connected to a radiation source, to provide a beam for irradiating powder in the building platform region for manufacturing the component layer by layer; and a shielding gas system for providing an areal stream of shielding gas in the manufacturing chamber. The shielding gas system includes at least one outlet opening structure and a suction opening structure, which are configured for the inflow of gas into the manufacturing chamber or for the suction of gas from the manufacturing chamber. The outlet opening structure and the suction opening structure are arranged on opposite sides of the main housing such that the areal stream of shielding gas flows over the working surface between opposite sides of the main housing. Furthermore, the shielding gas system has at least one secondary outlet opening for the inflow of gas in the direction of the areal stream of shielding gas into the manufacturing chamber, at least one secondary outlet opening being configured to form at least one secondary shielding gas stream, which co-determines the flow profile of the areal stream of shielding gas. Thereby, to co-determine the flow profile of the areal stream of shielding gas in the region in front of the suction opening structure, the at least one secondary outlet opening is provided on a side wall connecting the opposite sides of the main housing with a corresponding outflow direction directed onto the areal stream of shielding gas.

As used herein, an "areal" stream refers to a gas flow or stream involving an area, that is, is two dimensional. Examples include a slot-shaped flow, a planar stream, an in-plane stream, or layered/layer-shaped stream, or an elongate outflow region that extends parallel a surface.

In a further aspect, the disclosure provides methods for suction from a manufacturing chamber for additive manufacturing that include the step of providing a shielding gas stream, which flows areally and parallel to a working surface provided in the manufacturing chamber over a powder bed in the building platform region; and the step of increasing the suction-removal capacity while maintaining the flow velocity of the shielding gas above the powder bed (and/or homogenizing the flow velocity of the shielding gas above the powder bed) by at least one additional shielding gas stream, which is supplied to the areal stream of shielding gas laterally, from above, and/or obliquely from above.

In a further aspect, the disclosure provides manufacturing devices for the additive manufacturing of a three-dimensional component from powder that include a main housing, which provides a working surface in a manufacturing chamber on which a building platform region is provided; —an optical system, which can be connected to a radiation source, for providing a beam for irradiating powder in the building platform region for manufacturing the component layer by layer; and a shielding gas system for providing an areal stream of shielding gas. The shielding gas system includes at least one outlet opening structure and a suction opening structure that are configured for the inflow of gas into the manufacturing chamber or for the suction of gas from the manufacturing chamber and that are arranged on opposite sides of the main housing such that the stream of shielding gas flows over the working surface between opposite sides of the main housing. Furthermore, the shielding gas system has at least one secondary outlet opening structure that is arranged and configured such that a secondary shielding gas stream flows into the manufacturing chamber obliquely from above at an angle to the working surface to counteract any recirculation of the areal stream of shielding gas (or at least a portion of the recirculation).

In some embodiments, the at least one secondary outlet opening is arranged and configured on a front frame, the door, or the ceiling such that the secondary shielding gas stream flows out obliquely to the areal stream of shielding gas and counteracts a fanning out of the areal stream of shielding gas towards the side and/or upwards. As a result, the flow profile can be formed with a substantially constant velocity distribution over the entire building platform region, at least over a building platform arranged in the building platform region. For example, the at least one secondary outlet opening can be provided on a side wall connecting the opposite sides of the main housing and/or above, laterally of, and/or laterally above the outlet opening structure with a corresponding outflow direction directed onto the areal stream of shielding gas.

In some embodiments, the outlet opening structure can include an elongate outflow region, which extends parallel to the working surface, for producing a shielding gas stream flowing areally and parallel to the working surface. Likewise, the suction opening structure can include an elongate suction region extending parallel to the working surface for receiving an areal stream of shielding gas flowing areally and parallel to the working surface, and/or the at least one secondary outlet opening can include an elongate outflow region extending parallel to the working surface. Optionally, the outlet opening structure, the suction opening structure, and the at least one secondary outlet opening can be arranged substantially at the same distance above the working surface.

In some embodiments, the shielding gas system can be configured such that the stream of shielding gas is homogenized by gas that flows into the manufacturing chamber from the at least one secondary outlet opening before the suction opening structure such that an almost constant flow velocity is formed in the building platform region and/or in the powder reservoir region between the outlet opening structure and the suction opening structure. In some embodiments, the almost constant flow velocity can lie below a characterizing velocity at which the powder bed is swirled up.

The orientation of the areal stream of shielding gas can be transverse, oblique, or along the alignment direction and it can flow substantially parallel to the working surface. The at least one secondary outlet opening can include a sequence of outlet openings. For example, the at least one outlet opening structure can be arranged in the region of the front wall, e.g., on or in the front wall, or in a door of the manufacturing device, and the suction opening structure can be arranged on or in the rear wall of the manufacturing device, or vice versa. Furthermore, the outlet opening structure and the suction opening structure can be arranged on opposite side walls of the manufacturing device.

In some embodiments, the manufacturing device further includes a building cylinder that includes a stamp, which is lowerable and provides for a building platform and for forming a powder bed, and a component-powder region, which is delimited by the dimensions of the stamp and connected to the building platform region by an irradiation opening in the working surface, wherein the shielding gas system forms the areal stream of shielding gas substantially transversely, obliquely, or along the alignment direction of the openings in the working surface.

The shielding gas system can include an outlet opening structure, e.g., arranged on or in a front wall or a door of the manufacturing device, and a suction opening, e.g., arranged on or in a rear wall of the manufacturing device. The outlet opening structure and the suction opening structure can be on opposite sides of the building platform. The outlet opening structure and/or the suction opening structure can be configured such that an, e.g., laminar, course of flow of the areal stream of shielding gas is formed that is directed in the direction of the building platform.

The shielding gas system can be configured as a gas circuit, which includes a filter device with a drying medium for extracting moisture from the gas. The drying medium can be arranged in an exchangeable component that can, for example, be separated by valves within the gas circuit. In general, the shielding gas system can further include a shielding gas tank and/or a shielding gas connection, a pump system, valves, and/or lines for connection of individual components of the gas circuit for guiding argon or nitrogen. The shielding gas system can be accommodated in a main housing portion that is arranged for example below and behind the manufacturing chamber and a (door) portion, or integrated into a door.

In some embodiments, the shielding gas system is configured to provide an areal stream of shielding gas that includes a drying gas stream in the area of the powder supply and a particle removal gas stream in the area of the building platform.

An advantage of the concepts described herein is that the manufacturing chamber can be extracted more rapidly by the additional lateral supply of gas and thus a larger particle removal gas stream is caused. Furthermore, as a result of the lateral arrangement of the secondary in-flow openings and the secondary inflow, a fanning out of the areal stream of shielding gas between the inflow location and the outflow location can be suppressed. In particular, the secondary inflow can cause an acceleration of the gas stream over the building field in the rear region. Without secondary inflow on the other hand, a reduction in the velocity could occur here due to fanning out of the stream so that the production conditions in the area of the building platform (front-back) vary. Accordingly, the concepts disclosed herein can allow particles to be removed from the entire production region under comparable conditions, and the 3D component to be built.

In some embodiments, the secondary outlet opening structure is configured such that the secondary gas stream is delivered obliquely in the direction of the rear wall. The secondary outlet opening structure can include an arrangement of slits that are aligned at an angle in the range of 10° to 40° to the normal direction of the working surface and jointly form a two-dimensional inlet region of the secondary gas stream in the manufacturing chamber. Furthermore, the secondary outlet opening structure can include an arrangement of slits transverse to the long axes of the slits and optionally further includes an arrangement of slits along the long axes of the slits and wherein optionally the slits or rows of slits have a spacing a 0.5 mm to a few millimeters.

The concepts disclosed herein are particularly effective for larger building platforms, which are more prone to a disadvantageous fanning out of the areal stream of shielding gas. In general, the concepts described herein can thus enable a stabilization of the manufacturing process.

DESCRIPTION OF DRAWINGS

FIG. 2 shows a schematic sectional view of the additive manufacturing device of FIG. 1 parallel to the XY plane through the manufacturing chamber.

FIG. 3 shows a schematic sectional view of the additive manufacturing device of FIG. 1 parallel to the XZ plane through the manufacturing chamber, as indicated in FIG. 2.

FIGS. 4A-4D show schematic exemplary sectional views of the additive manufacturing device from FIG. 1 parallel to the YZ plane through the manufacturing chamber as indicated in FIG. 2 (FIGS. 4A and 4B) and through a secondary outlet opening (FIGS. 4C and 4D).

DETAILED DESCRIPTION

Aspects described herein are partially based on the realization that a course of flow in the manufacturing chamber can result in different flow velocities and therefore in a spatially varying effect of the flow on the manufacturing process. It was further identified that in the manufacturing chamber, due to specific lateral inflow, with the same or a reduced flow velocity compared to the main flow, the formation of the flow in a relevant region/in relevant regions can be homogenized.

The additional inflow allows an increased suction-removal and therefore a more rapid exchange of gas in the manufacturing chamber, this without reaching flow velocities close to the powder, which would move and turbulize the powder.

Figure 1:
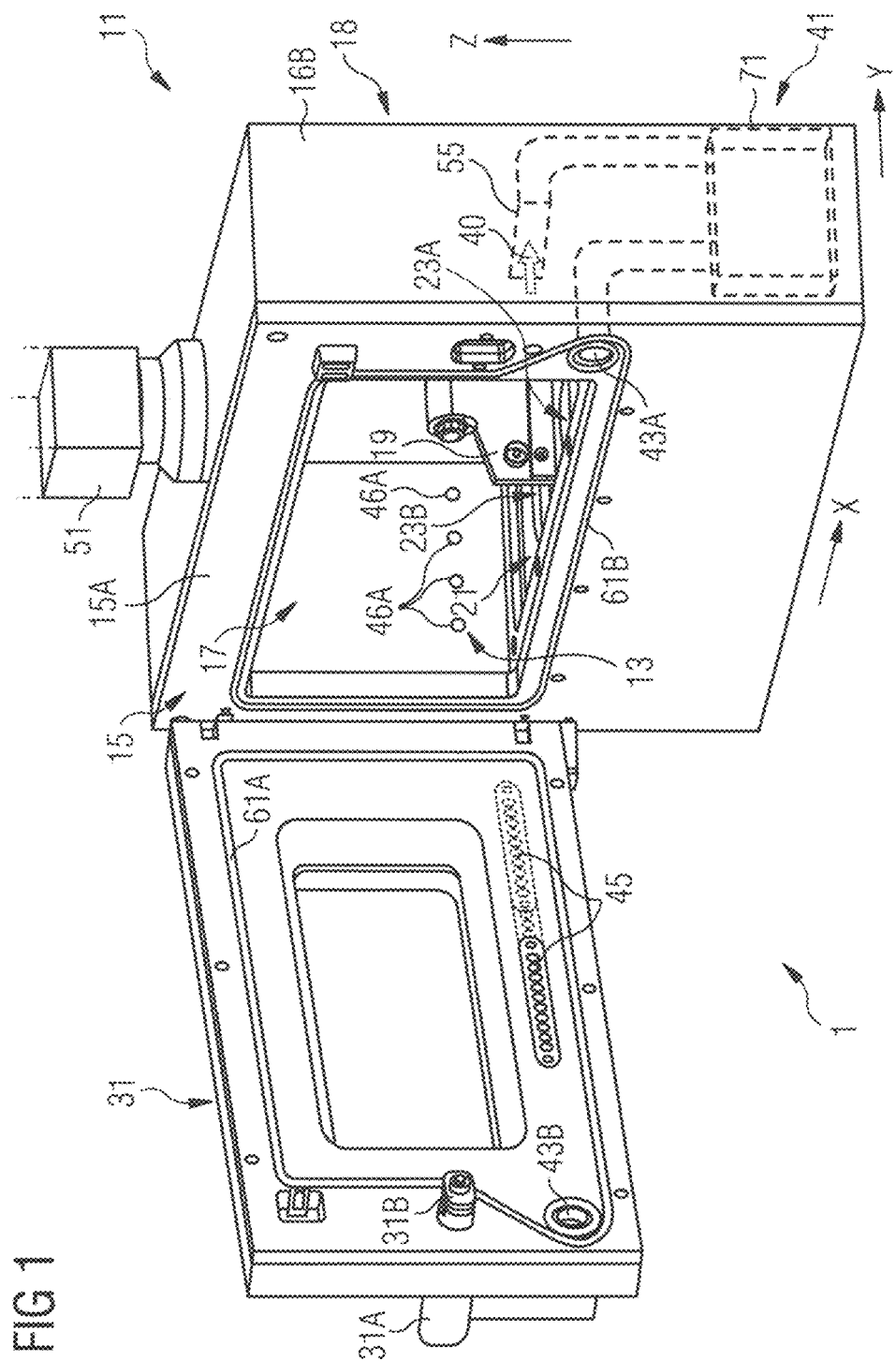
FIG. 1 shows a schematic three-dimensional view of an exemplary additive manufacturing device.

FIG. 1 shows an exemplary additive manufacturing device 1 for generating a 3D component 3 from a powder 5. For the manufacturing process reference is made to the initially mentioned EP 2 732 890 A2, the contents of which are incorporated herein by reference. The manufacturing device 1 includes a main housing 11 that provides a manufacturing chamber 13. A front wall 15 delimits the manufacturing chamber 13 on the front side. The main housing 11 further includes a rear wall 18, two side walls 16A, 16B, and a top, which together define the manufacturing chamber 13. The front wall 15 has a front frame 15A with an opening 17 through which access to the manufacturing chamber 13 of the manufacturing device 1 is made possible. The opening 17 can be closed during the manufacturing process by a door 31 (handle 31A, closure 31B) attached to the front wall 15 (see FIG. 2). When the door 31 is open, there is access to the manufacturing chamber 13 of the manufacturing device 1 (see FIG. 1) and an operator can carry out the necessary preparation steps such as cleaning the manufacturing chamber 13 and refilling a powder container and removing the finished component 13.

FIG. 1 further shows a slider 19 (also called wiper) for distributing the powder 5 during the manufacturing process. The manufacturing process takes place on a working surface 21 that forms the bottom of the manufacturing chamber 13. The working surface 21 has a building platform region 23A, a powder reservoir region 23B and (optionally) a powder collecting region 23C. The building platform region 23A can be central in relation to the opening 17. The irradiation process to produce the 3D component 3 takes place therein. The powder reservoir region 23B is used to provide fresh powder 5A, which is transferred into the building platform region 23A with the slider 19.

As shown in FIG. 2, the building platform region 23A is in the X direction between the powder reservoir region 23B and the powder collecting region 23C. The powder reservoir region 23B includes a, for example, cylindrical, powder supply container 25 whose upper end opens into a (powder) provision opening 21B of the working surface 21. With the aid of a stamp 25A, for example, metallic or ceramic powder 5 can be gradually raised from the powder supply container 25 over the working surface 21 (along arrow 26). If a new layer is required for irradiation, the fresh powder 5A projecting over the working surface 21 can be displaced with the slider 19 laterally in the X direction into the building platform region 23A. Accordingly, the slider 19 in FIG. 2 extends in the Y direction, which runs orthogonally to the front wall 15 and parallel to the working surface 21.

The building platform region 23A has a, for example, cylindrical, building cylinder 27 with a stamp 27A, which is lowerable and provides a platform for forming a powder bed. Due to the lowering, a component-powder region delimited by the platform is formed, which is connected to the building platform region 23A through the irradiation opening 21A in the working surface 21. If a layer of the component 3 was formed by melting of powder 5, the stamp 27A is lowered so that a recess delimited by an irradiation opening 21A in the working surface 21 is formed, into which fresh powder can be displaced with the slider 19 so that a new upper powder layer is formed in the powder bed to be irradiated. Powder not required to build the new layer can be displaced with the slider 19 through an opening 21C of the working surface 21 in the powder collecting region 23C, e.g., for reuse in a collecting container.

The main housing 11 further includes at least parts of a shielding gas system 41 such as, for example a shielding gas tank and/or a shielding gas connection and a pump system (not shown) as well as a filter unit 71 (indicated schematically in FIG. 1). The shielding gas system 41 allows the manufacturing chamber 13 to be flooded with a gas, for example, inert gas such as argon or nitrogen, during the manufacturing process. Further details of the shielding gas system 41 are explained hereinafter in connection with FIG. 5.

An irradiation system can be connected to an optical system 51 attached to the main housing 11, e.g., via the building platform region 23A. The irradiation system is configured to produce radiation, e.g., laser light, which can melt the powder 5 to form material layers of a component 11. It is based, for example, on a fiber or disk laser system. Alternatively, laser light can be guided from such a source to the optical system 51 on the main housing 11. The optical system 11 includes a scanner system that can guide the radiation in a path matched to the component 3 in the building platform region 23A for local melting of the uppermost powder layer of the powder bed.

As discussed initially, during the interaction of the radiation/the laser light with the powder, a flushing of the manufacturing chamber 13 takes place with the result that smoke gases with particles can be removed from the manufacturing chamber.

The shielding gas system 41 is designed such that an areal stream 40 of shielding gas is formed in the manufacturing chamber 13 that has a particularly favorable flow profile and that is formed in two dimensions over the irradiation opening 21A in the working surface 21 for removal of smoke gas. Additionally or alternatively to the removal of smoke gas from the actual production zone, the areal stream 40 of shielding gas can in the area of the opening 21B of the working surface 21 flow as a surface drying stream over the uppermost powder layer of the powder supply container 25 (indicated by dashed arrows and structures in FIGS. 1 to 3).

In the embodiment shown, the areal stream 40 of shielding gas is formed substantially transversely to the alignment direction (here the X direction) of the openings 21A, 21B parallel to the working surface 21, for example, it flows accordingly in the Y direction via the openings 21A, 21B in the working surface 21. The areal stream 40 of shielding gas is co-formed in its flow profile by gas streams 42A, which flow from openings 46A in the side wall 16A adjacent to the powder reservoir region 23B laterally into the manufacturing chamber 13. Alternatively or additionally, gas streams 42B from secondary outlet openings 46B (indicated by dashed lines) can further be provided in the side wall 16B adjacent to the powder collecting region 23C.

In the implementation of the desired course of flow in the manufacturing chamber 13 shown, as an example, in FIGS. 1 to 4, the course of flow is implemented in combination with a special course of flow for removal of soot. In this case, the areal stream 40 of shielding gas flows from the door 31 to the rear wall 18 (or in the opposite direction) via the building platform region 23A. Herein soot is representative for extremely small particles, which can be formed during the interaction of laser light with the powder. To prevent any influencing of the manufacturing process (deposition on optics or the component itself), these extremely small particles can be blown by a corresponding flow from the interaction area and then removed by suction. In so doing, however, the areal stream 40 of shielding gas should not influence the quality of the manufacturing, for example should not stir up the powder bed.

The shielding gas system 41 includes a main housing portion, which is arranged, for example, underneath and behind the manufacturing chamber 13, and a door portion integrated in the door 31. The main housing portion includes, for example, the shielding gas tank and/or the shielding gas connection to an external shielding gas source, a pump system, and the filter unit 71.

The filter unit 71 is connected to one or more suction opening structures 55 in the rear wall 18 via a line. The suction opening structure 55 is arranged in the area of the powder reservoir region 23B close to the working surface 21 and is indicated schematically in FIG. 2.

The filter unit 71 is fluidically connected to one or more outlet opening structures 45 in the door 31. To this end, the main housing portion of the shielding gas system 41 includes a line to the front wall 15, which opens in a (housing) connecting opening 43A in a region covered by the door 31. The connecting opening 43A is in fluid communication with the door portion of the shielding gas system 41 when the door 31 is closed via a (door) connecting opening 43B and connecting lines.

To produce an areal stream 40 of shielding gas flowing areally and parallel to the working surface 21, the outlet opening structure 45, for example, includes an elongate outflow region extending parallel to the working surface 21. In FIG. 1, such an elongate outflow region is formed by a plurality of round openings arranged in a row.

Accordingly, the suction opening structure 55 can include an elongate suction region extending parallel to the working surface 21 to receive the areal stream 40 of shielding gas flowing parallel to the working surface 21. In FIG. 3, such a suction region is indicated schematically by an elongate rectangle that extends parallel to the working surface 21.

Figure 4B:
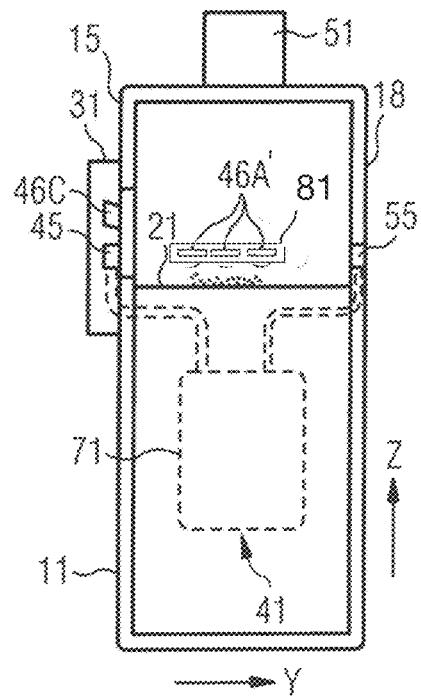

The four secondary outlet openings 46A in FIG. 4A can be arranged to form an elongate outflow area extending parallel to the working surface 21. The same applies to the slit-shaped outlet openings 46A', 46A" that are fluidically connected to the filter unit 71 like the outlet opening structures 45 and which are described hereinafter in connection with FIGS. 4B to 4D.

In some embodiments, switchable valves can control the outflow of the shielding gas from the outlet opening structure 45 and the secondary outlet openings 46A, 46B, 46A', 46A". The outlet opening structure 45 and/or the suction opening structure 55 and/or the secondary outlet openings 46A, 46B, 46A', 46A" can be formed such that an as far as possible laminar (in the direction of the provision opening 21B) directional course of flow is formed as close as possible over the working sur-face 21. An exemplary embodiment of a slit-shaped outlet opening specifically configured for this purpose is explained in connection with FIG. 4D.

As indicated in FIG. 1, the secondary outlet openings 46A can be formed as an arrangement of outlet openings on at least one of the side walls 16A, 16B. For example, four bores per side wall 16A, 16B are implemented in each case. These each have, for example, a diameter of several 10 mm, e.g., 60 mm. Shaped sheet metal nozzles can be screwed into these recesses, which nozzles make the secondary gas stream emerge, for example, directed laterally (or downwards) from an opening tapered correspondingly, for example, to 50 mm. Thus, for example, shoulders can be provided so that perforated plates or nozzles can be inserted in the bores. These additional inflow openings can have other positions and shapes, wherein the formation of possible inserts can be adapted variably to different flow velocities—due to, for example, different-sized manufacturing chambers.

Approaches to produce a secondary gas stream 42A' whose course of flow is as far as possible laminar and optionally directed as close as possible over the working surface 21, and the powder 5, are possible due to the use of slit-shaped outlet openings 46A'. For example, FIG. 4B shows an arrangement of, as an example, three slit-shaped outlet openings 46A' on the side wall 16A and that are arranged at a distance in the range of 5 to 50 mm above the working surface 21.

Figure 4C:
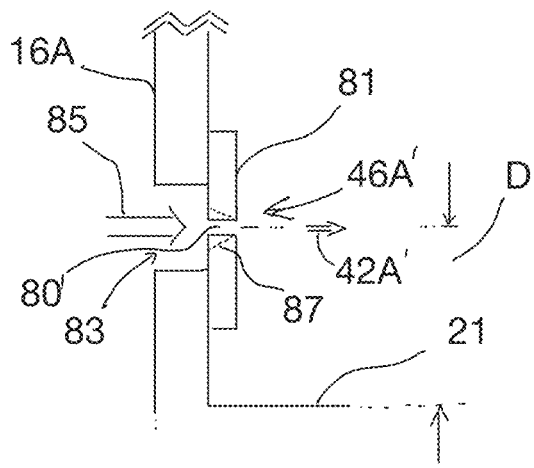

The slit-shaped outlet openings 46A', 46A" have a very small (e.g., in the submillimeter range) slit thickness in the Z direction and a considerably greater (e.g., in the millimeter to centimeter range) slit length (in FIG. 4B in the Y direction), that is, running parallel to the working surface 21. In FIG. 4C the distance relative to a center point in the Z direction of the slit-shaped outlet opening 46A' is shown (indicated by a dot-dash central line of the opening).

Figure 4D:
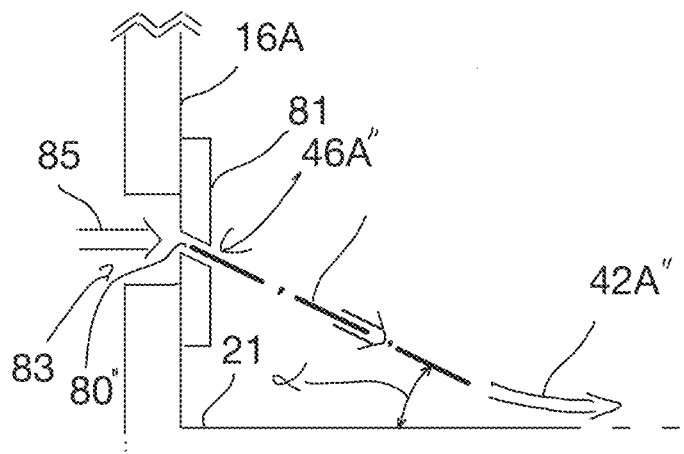

As shown in FIGS. 4C and 4D, the slit-shaped outlet openings 46A', 46A" can be the out-flow slits 80', 80" pertaining to the opening lying on the side of the manufacturing chamber in a bezel sheet metal 81. The slit 80', 80" has been incorporated in the bezel sheet metal 81, for example, by laser machining. In general, the depth of the outflow slit 80', 80" (in FIG. 4C in the X direction) is given by the thickness of the bezel sheet metal 81 (delimited at the bottom).

The bezel sheet metal 81 covers openings 83 in the side wall 16A, which are supplied with gas from the shielding gas system 41. The gas supply is illustrated in FIGS. 4C and 4B by an arrow 85. Accordingly, a flat gas stream 42A', 42A" will emerge from the slit-shaped outlet opening(s) 46A' and continue in the direction of the primary gas stream 40 and combine with this as an areal stream 40 of shielding gas. In general, the lateral co-forming of the areal stream 40 of shielding gas by the slit-shaped openings 46A' can have the effect that the gas stream 40 is formed as homogeneously as possible over the powder bed.

Several slits or rows of slits can be arranged one above the other for this purpose. The slits or rows can have a spacing of 0.5 mm to several millimeters, wherein up to 1000 rows and more can be provided depending on the slit size.

The slit-shaped outlet openings 46A', 46A" in this case have a thickness, which is usually narrower than the thickness of the bezel sheet metal 81 to achieve the shaping of the beam. In exemplary embodiments, the thickness of the outflow slit 80', 80" and thus the thickness of the outlet openings 46A', 46A" is in the range of 15 µm to 250 µm, for example, in the range of 20 µm to 200 µm. For example, the slits 80', 80" have a minimal thickness of 150 µm or 50 µm. At the same time, the slit 80', 80" can, for example, have a cross-section that tapers slightly or that expands towards the outlet side. A tapering cross-section is indicated by dashed lines 87 in the sectional views of FIG. 4C and can result in an additional nozzle effect.

A preferred slit depth is greater than the slit thickness and the slit length can be selected depending on the number of outflow slits 80', 80" such that a secondary stream 42A', 42A" is built up. Exemplary slit lengths lie in the range of 2 mm to 50 mm with a number of up to 10 or more slits.

FIGS. 4C and 4D illustrate schematically two exemplary orientations of outflow slits 80', 80" in the bezel sheet metal 81. The formation of the outflow slit 80' in FIG. 4C is parallel to the working surface 21 and thus causes the gas stream 42A' to run parallel to the bottom.

The outflow slit 80" in FIG. 4D was prepared by oblique cutting at an angle $\alpha$ to the normal to the sheet metal upper side, with the result that the secondary gas stream impinges obliquely downwards at the angle $\alpha$ onto the working surface 21. The angle of a slit depth axis 89—the axis defining the alignment of the slit in the through-flow direction—relative to the working surface 21 (and therefore the primary course of flow) lies in the mounted state of the bezel sheet metal 81, for example, in the range of 0° (parallel to the bottom) to 50°. With a slit thickness of 150 for example, with an angle in the range of 10° to 40°, e.g., 20° or 30°, between the slit depth axis 89 and working surface 21 can result in a quasi-laminar secondary gas stream 42A" that, as indicated in FIG. 4D, adheres to the working surface 21 and keeps the primary gas stream from diverging.

As explained, a bezel sheet metal provided with outflow slit(s) 80', 80" can be used to produce lateral gas flows because the secondary gas stream then rapidly impinges on the working surface 21. There the gas flows have the tendency to move along the bottom surface so that, as is advantageous for the lateral gas flows, a readily controllable shielding gas stream can be obtained. When the lateral (or primary) outflow slits are provided in the near-process region, a correspondingly effective shielding gas stream can thus be formed.

As indicated, the primary openings can also be slit-shaped and formed to run at an angle to the bottom. Generally primary and secondary outflow slits can vary in position, number, and angular orientation in the area of the inlet openings (primary and secondary).

In technically high-quality LMF machines, in addition to the main flow, auxiliary flows can also be generated during circulation of the process gas. The auxiliary flows are in this case formed using one or more laser-slitted walls (for example, explained with respect to the bezel sheet metal). As mentioned, the outflow slits can, for example, be created using a laser-based oblique cutting at an angle of, e.g., 30° to the surface normal of the side wall (in the case of a side wall/bezel sheet metal arranged perpendicular to the bottom surface). The outflow slits and correspondingly produced auxiliary flows are accordingly used as means for the targeted design of the course of flow in the manufacturing chamber. Undesired backflows, turbulence of shielding gas laden with process residues can thus be avoided or at least reduced so that overall process residues can be detected more efficiently and supplied to the filter unit.

To form a laminar flow profile extending parallel to the working surface 21, the outlet opening structure 45, suction opening structure 55 and the one or more secondary outlet openings 46A, 46B, 46A', 46A" can be arranged substantially at the same distance above the working surface 21.

Figure 5:
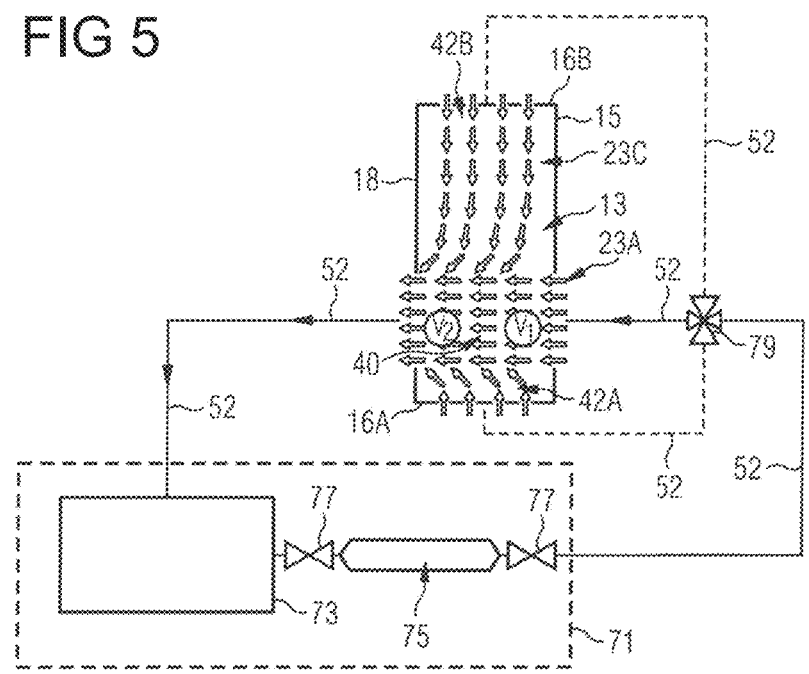
FIG. 5 shows a sketch to illustrate an exemplary gas circuit of an additive manufacturing device.

In general, the shielding gas system 41 is configured to homogenize the areal stream 40 of shielding gas by gas, which flows into the manufacturing chamber 13 from the one or more secondary outlet openings 46A, 46B, 46A', 46A", before the suction opening structure 55 such than an almost constant flow velocity is formed in the building platform region 23A and/or in the powder reservoir region 23B between the outlet opening structure 45 and the suction opening structure 55. In FIG. 5 flow velocities v1 and v2 are assigned to the front or rear areas (in relation to the accessibility of the manufacturing chamber 13). The aim of the adjustment of the gas stream emerging from the secondary outlet openings 46A, 46B, 46A', 46A" is to adapt the flow velocities v1 and v2 in their size. The increase in the suction-removal capacity causes an acceleration of the primary stream over the building platform in the rear area, that otherwise could have flown too slowly thereover. An almost constant flow velocity should be caused thereby, which lies below a critical velocity that turbulizes the powder bed.

To this end, the additive manufacturing device 1 has a control unit for adjusting the velocity and/or the quantity of the gas emerging from the at least one secondary outlet opening 46A, 46B, 46A', 46A" and for adjusting the suction-removal capacity through the suction opening structure 55. The latter can be increased by additional lateral inflow of gas through the outlet openings 46A, 46B, 46A', 46A" without the flow velocity being too high near the powder bed. In general, as much gas as flows in can be removed by suction. That is, an increase in the inflow volume due to additional lateral inflow causes an increase in the suction-removal.

Without additional lateral inflow of gas through the outlet openings 46A, 46B, 46A', 46A", the transverse stream can fan out so that the flow velocity v2 (close to the outlet) is lower than the flow velocity v1 (near the inlet) and thus spatially varying conditions can be formed, e.g., with regard to the smoke removal above the powder bed, which can influence the manufacturing process in the case of large building platforms.

In general, the shielding gas system 41 is configured to allow shielding gas to flow out on one side of the main housing 11 in the direction of the working surface 21 and remove the shielding gas on an opposite side.

The slider 19 can be formed such or positioned during production such that a flow profile is obtained that is as uniform as possible. For example, during irradiation, the slider 19 can be positioned in a waiting position between the powder reservoir region 23B and the building platform region 23A (see FIG. 2) so that the different streams for drying and for smoke removal only slightly influence each other. In this case, the flow profile is influenced via the gas streams 42A, 42B. The respective streams can be activated, reduced, or completely prevented depending on the current manufacturing step.

In some embodiments, the slider 19 includes a supply of co-transported powder so that manufacturing devices for additive manufacturing can be implemented with a working surface without a powder reservoir region 23B and therefore more compactly. In this case, the supply of co-transported powder is, for example, filled outside the working surface.

The implementation of the concepts disclosed herein can be integrated in the shielding gas flushing of the entire system, the shielding gas flushing of at least a large part of the manufacturing chamber during the entire manufacturing process. The shielding gas can circulate in a gas circuit in which the gas stream is dried with a drying agent and is possibly additionally cleaned with a filter for separating extremely small particles/suspended matter such as soot for example. Alternatively, the gas stream can be part of a superordinate gas drying and cleaning process, e.g., dry gas is supplied and the moist gas is supplied to a central processing unit.

A gas circuit is shown schematically in FIG. 5. The areal stream 40 of shielding gas can be identified, which flows transversely to the longer extension of the rectangularly configured working surface 21. Furthermore, the laterally inflowing gas streams 42A, 42B, 42A', 42A", which are jointly removed by suction at the rear wall, can be identified. The moist and/or soot-carrying shielding gas is supplied to the filter unit 71 via gas lines 52.

The filter unit 71 has an ultrafine filter 73 for the removal of particles from the gas. A subsequent drying of the gas stream is accomplished by passing over a drying medium in a preferably easily exchangeable component, for example, a tube 75. The tube 75 can, for example, be separated by valves 77 at both ends from the gas circuit so that the drying medium used can be exchanged easily and rapidly. In general, impurities can be avoided, for example, with a further filter (not shown) or with correspondingly fine-pore packaging of the drying medium, for example.

The purified and dried gas stream is then returned via lines 52 and possibly valves 79 into the manufacturing chamber 13. In this case, the gas stream can be supplied to different outlet openings wherein the valves 79 for adjustment of the flow paths and the flow velocities can be controlled with a control unit (not shown).

In the embodiments shown as an example in the figures, the outlet opening structure 45 and the suction opening structure 55 are arranged on the side of the front wall 15 in the door 31 of the manufacturing device 1, and on or in the rear wall 18 of the manufacturing device 1. The concepts disclosed herein for avoiding fanning out and/or for compensating the velocities can however also be applied to an inverted flow direction (e.g., from behind/from the rear wall towards the front/towards the front wall) or to flow directions from left to right or from right to left (e.g., between the side walls).

In general, at least one secondary outlet opening can be arranged and configured on the front frame, the door, or the top ceiling such that a secondary shield gas stream can flow from it obliquely to the areal stream of shielding gas, which counteracts a fanning out of the areal stream of shielding gas to the side and/or upwards and preferably compensates or prevents this. As a result, the flow profile can be formed with a substantially constant velocity distribution over the entire building platform region, at least over a building platform arranged in the building platform region.

In general, the fanning out of the areal stream 40 of shielding gas both from the side and also from above can be counteracted to force the flow as comprehensively as possible in the direction of the suction opening structure. In some embodiments, an additional shielding gas stream acting only laterally, e.g., laterally from both sides or merely from above can be sufficient. Thus, an additional shielding gas stream flowing from the top and/or the door (or depending on the flow direction from the rear wall) can act from above onto the fanning-out areal stream 40 of shielding gas. As a result, the additional shielding gas stream can keep the areal stream 40 of shielding gas, which slows due to the fanning out, at substantially constant velocity in a laminar flow close to the powder bed even if a lateral fanning out of the areal stream 40 of shielding gas should occur (in FIG. 2 along the X axis). For example, in FIG. 4, a secondary outlet opening 46C arranged above the outlet opening structure 45 with walls running obliquely to the horizontal is indicated schematically.

Furthermore, the additional shielding gas stream acting in the vertical direction can support one or more laterally acting additional shielding gas streams from lateral secondary outlet openings. Laterally acting shielding gas streams can also be produced with outlet openings provided next to the outlet opening structure which have an outflow direction directed through, for example, a corresponding wall laterally onto the areal stream 40 of shielding gas.

In general, a lateral shielding gas stream can guide the smoke/particles transported by the areal stream 40 of shielding gas directly in the direction of the elongate suction opening structure formed parallel to the working surface 21 (mostly horizontal).

In the embodiment shown as an example in the figures, a flow is indicated above the powder reservoir region 23B and above the building platform region 23A. As a powder drying need not be necessary or can be caused by other measures than that of a drying gas stream, further sizes of gas streams are feasible, which are substantially restricted to the building platform region 23A. The concepts disclosed herein for avoiding fanning out and/or for compensating velocities can be implemented accordingly. Furthermore, a laterally entering secondary gas stream can be used for (supporting) drying of the powder in the powder reservoir region 23B, particularly when only opening structures 45, 55 are provided for the building platform (e.g., in door and rear wall centered to the building platform) and no further opening structures are used for the powder reservoir region 23B.

Figure 6:
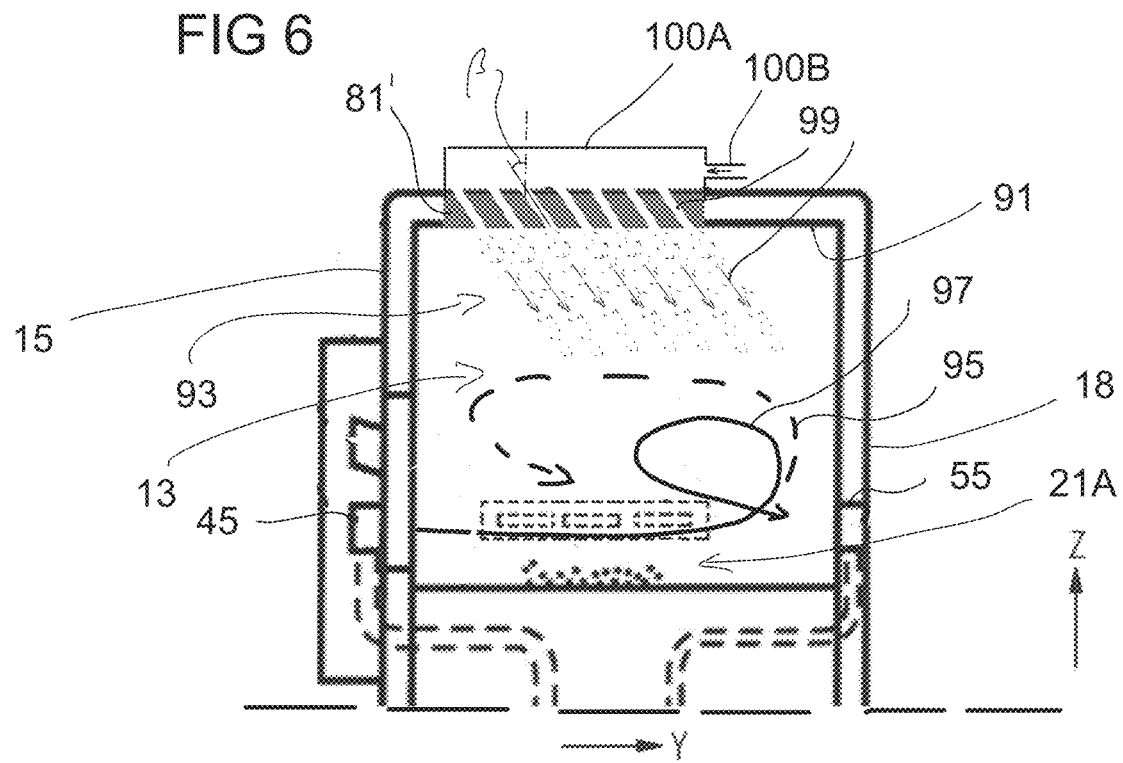
FIG. 6 shows a sketch to illustrate the influencing of the flow with an arrangement of obliquely cut slits in the top.

In a sectional view similar to FIGS. 4A and 4B, FIG. 6 illustrates an exemplary embodiment in which an additional shielding gas stream 93 flowing from a ceiling wall 91 of the manufacturing chamber acts from above (e.g., at an angle to the working surface 21 obliquely from above) in the region of the building platform region 21A on the areal stream of shielding gas or a backflow taking place thereover.

For illustration, a flow path 95 is indicated by a dashed line in the manufacturing chamber such as could form without a shielding gas stream 93. Especially in this case a part of the areal stream of shielding gas is deflected upwards at the end of the manufacturing chamber 13 before the suction opening structures 55 and flows areally back to the front wall 15 until it again affects the areal stream of shielding gas from above. This extensive recirculation can have a disadvantageous effect on the desired effect of the areal stream of shielding gas.

With the additional shielding gas stream 93, an upwardly deflected flow path 97 is localized on the rear part of the manufacturing chamber 13 and the recirculation is restricted in its volume size. As a result, the additional shielding gas stream 93 can reduce the influence on the areal stream of shielding gas in the area of the building platform and the areal stream of shielding gas can thus be formed more uniformly above the building platform region 21A.

To produce the additional shielding gas stream 93, the ceiling wall 91, for example, includes an outlet opening structure 82 configured as bezel 81'. An arrangement of slits 99 is provided in the bezel 81', which are fluidically connected via a gas distribution housing 100A and gas supply line 100B to the gas system to deliver shielding gas into the manufacturing chamber 13. The slits 99 are formed at an angle $\beta$ in the range of 10° to 40°, e.g., 20° or 30° to the Z direction in the bezel 81' so that a strip-shaped initial jet emerges from each of the slits 99 (arrow 101 at the center of a jet depicted by dotted lines). These enter into the manufacturing chamber 13 together as shielding gas stream 93 obliquely in the direction of the rear wall 18.

The bezel 81' is an example of an oriented slitted top wall of the manufacturing chamber, wherein the slits 99 have been incorporated, for example, by an oblique laser cutting method. The bezel 81' exemplarily has a thickness of several millimeters (e.g., 2 mm) with a slit width in the range of 15 µm to 250 µm, for example, in the range of 20 µm to 200 µm, e.g., 0.2 mm. A corresponding aspect ratio in the cross-section of a slit 99 of, for example, about 10:1 causes a directional strip-shaped outlet jet of the slit 99.

Preferably the bezel 81' is arranged in the front area of the ceiling wall 91 (for example, as far as the middle of the manufacturing chamber or up to ⅔ of the manufacturing chamber). The slits 99 or an arrangement of slits extends in the X direction, for example, at least over the extent of the building platform region 21A and/or the powder reservoir region 21B and over, for example, 50% of the depth of the manufacturing chamber 13 in the Y direction. As a result, the shielding gas stream 93 can have a two-dimensional cross-section, for example, with comparable dimensions in the X direction and Y direction, when only the building platform region 21A should be influenced.

The previously explained aspects for slits of FIGS. 4B to 4D can be applied accordingly to the embodiment of FIG. 6.

It is further noted that lateral slit structures can be implemented according to the manner of an oriented slitted wall discussed in connection with FIG. 6, for example, to align the laterally incoming secondary gas stream obliquely in the direction of the rear wall. This can be implemented for flow directions lying in the X-Y plane (FIG. 4C) or also for flow directions directed to the bottom (FIG. 4D), wherein here the slits are inclined obliquely in relation to the XZ plane so that the narrow side end surfaces of the slits run at an angle to the XZ plane. To increase a gas-stream guiding effect of the narrow side surfaces, the number of slits in the Y direction can be increased accordingly. The same also applies for example to round openings.

LMF machines in which the concepts described herein can be used include, for example, the systems "mysint 100", "TruPrint 1000," and "TruPrint 3000".

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, as limits of value ranges.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A manufacturing device for the additive manufacturing of a three-dimensional component from powder, comprising:

a main housing having two opposite side walls and two lateral side walls, wherein the lateral side walls are arranged between and connect with the two opposite side walls, and wherein the two opposite side walls and the two lateral side walls enclose a manufacturing chamber;

a working surface arranged in the manufacturing chamber and comprising a building platform region upon which the powder can be distributed;

an optical system configured to connect to a radiation source that provides a beam for irradiating powder in the building platform region for manufacturing the component layer by layer; and a shielding gas system that provides an areal stream of shielding gas in the manufacturing chamber, the stream having a flow profile, wherein the shielding gas system comprises:

at least one primary outlet opening structure and a suction opening structure configured and arranged to direct a primary flow of gas into and out of the manufacturing chamber, wherein the primary outlet opening structure is arranged on a first of the two opposite side walls of the main housing, wherein the suction opening structure is arranged on a second of the two opposite side walls, and wherein the primary outlet opening structure and the suction opening structure are arranged such that the primary flow of gas forms the areal stream of shielding gas, which flows therebetween and over the working surface; and at least one secondary outlet opening configured and arranged to direct a secondary flow of gas into the manufacturing chamber to form at least one secondary shielding gas stream, wherein the at least one secondary outlet opening is provided on one of the two lateral side walls of the main housing, and wherein the at least one secondary outlet opening comprises slits that extend at an angle to a normal direction of the side wall to direct the secondary shielding gas stream obliquely to the areal stream of shielding gas and towards the suction opening structure, thereby affecting the flow profile of the areal stream of shielding gas in a region in front of the suction opening structure.

2. The manufacturing device of claim 1, wherein the lateral side wall comprising the at least one secondary outlet opening is arranged and configured as a main housing side wall, as a front frame of the main housing, or as a door of the manufacturing chamber in the main housing such that the secondary shielding gas stream flows out obliquely to the areal stream of shielding gas and counteracts a fanning out of the areal stream of shielding gas to form a flow profile with a substantially constant velocity distribution over at least a building platform arranged in the building platform region.

3. The manufacturing device of claim 1, wherein the at least one secondary outlet opening is arranged in the lateral side wall at a level above the primary outlet opening structure with a corresponding outflow direction directed onto the areal stream of shielding gas, and wherein the slits of the at least one secondary outlet opening are configured and arranged at an angle in the range of 10° to 40° to a normal direction of the lateral side wall.

4. The manufacturing device of claim 1, wherein the primary outlet opening structure comprises an elongate outflow region that extends parallel to the working surface, and wherein the suction opening structure comprises an elongate suction region extending parallel to the working surface.

5. The manufacturing device of claim 1, wherein the at least one secondary outlet opening comprises an elongate outflow region extending parallel to the working surface.

6. The manufacturing device of claim 1, wherein the primary outlet opening structure, the suction opening structure, and the at least one secondary outlet opening are arranged substantially at the same distance above the working surface.

7. The manufacturing device of claim 1, wherein the shielding gas system further comprises a control unit that controls a velocity of the primary flow of gas and the secondary flow of gas such that the areal stream of shielding gas is homogenized before the suction opening structure in the building platform region or in the powder reservoir region between the primary outlet opening structure and the suction opening structure, and
wherein the areal stream of shielding gas flows at a velocity that lies below a critical velocity at which the powder bed is swirled up.

8. The manufacturing device of claim 1, wherein the manufacturing chamber is delimited at the bottom by the working surface, by a front housing wall, a rear housing wall, and two side housing walls, and at the top by a ceiling wall, and further comprising a powder reservoir region provided on the working surface and wherein the building platform region and the powder reservoir region are arranged next to one another in an alignment direction along the front wall and the areal stream of shielding gas flows parallel to the working surface.

9. The manufacturing device of claim 1, wherein the at least one secondary outlet opening comprises a sequence of outlet openings.

10. The manufacturing device of claim 8,
wherein the at least one primary outlet opening structure is in the region of the front housing wall, on or in the front housing wall, or in a front door of the manufacturing device, and the suction opening structure is on or in the rear housing wall of the manufacturing device, or
wherein the suction opening structure is in the region of the front housing wall, on or in the front housing wall, or in a front door of the manufacturing device, and the primary outlet opening structure is on or in the rear housing wall of the manufacturing device, or
wherein the primary outlet opening structure and the suction opening structure are on the two side housing walls, respectively, on opposite sides of the manufacturing device.

11. The manufacturing device of claim 1, further comprising:
a powder supply container for providing the powder through a supply opening in the working surface in the powder reservoir region, and
a building cylinder that comprises a stamp, which is lowerable and provided for a building platform and for forming a powder bed, and a component-powder region, which is delimited by the dimensions of the stamp and which is connected to the building platform region by an irradiation opening in the working surface,
wherein the primary outlet opening structure and/or the suction opening structure are configured and arranged such that the areal stream of shielding gas has a laminar course of flow in the direction of the irradiation opening and/or the supply opening.

12. The manufacturing device of claim 1, wherein the shielding gas system further comprises:
one or both of a shielding gas tank and a shielding gas connection,
a pump system,
valves, and
lines for connecting the individual components of the shielding gas system.

13. The manufacturing device of claim 1, further comprising a control unit configured to:
control the primary flow of gas to flow the areal stream of shielding gas in parallel to the working surface in the manufacturing chamber over a powder bed in the building platform region at a first flow velocity,
control the secondary flow of gas to flow the secondary shielding gas stream at a second flow velocity that is the same or lower than the first flow velocity, and
adjusting the second flow velocity and a quantity of gas emerging from the at least one secondary outlet opening and adjusting the suction-removal capacity through the suction opening structure.

14. The manufacturing device of claim 1, wherein the least one secondary outlet opening is an outflow slit with a slit-shaped opening, and wherein the at least one primary outlet opening comprises at least one outflow slit.

15. The manufacturing device of claim 14, wherein the at least one outflow slit has:
a thickness of the outlet openings in the range of 15 μm to 250 and
a slit depth that is greater than the slit thickness.

16. The manufacturing device of claim 14, wherein the at least one outflow slit has a slit depth axis that runs at an angle in the range of 0° to 50°.

17. The manufacturing device of claim 14, wherein the at least one outflow slit is provided in a bezel sheet metal or in a housing side wall, and the at least one outflow slit was produced by a laser cutting process.

* * * * *